United States Patent [19]

Allwine, Jr. et al.

[11] Patent Number: 4,575,022

[45] Date of Patent: Mar. 11, 1986

[54] REEL TO REEL TAPE DRIVE DEVICE

[75] Inventors: Elmer C. Allwine, Jr., Santa Clara; Paul A. Gilovich, Saratoga, both of Calif.

[73] Assignee: Interdyne Company, Milpitas, Calif.

[21] Appl. No.: 592,556

[22] Filed: Mar. 23, 1984

[51] Int. Cl.⁴ .......................... G03B 1/04; G11B 15/32
[52] U.S. Cl. .................................. 242/192; 360/96.6
[58] Field of Search ............... 242/192, 197, 198–200; 428/215, 473.5, 483; 474/237, 239, 262; 360/93, 96.6, 132, 60

[56] References Cited

U.S. PATENT DOCUMENTS

| | | | |
|---|---|---|---|
| 3,692,255 | 9/1972 | Von Behren | 242/192 |
| 3,907,230 | 9/1975 | Merle et al. | 242/192 |
| 4,054,923 | 10/1977 | Lewis | 360/60 |
| 4,274,608 | 6/1981 | Gilovich | 242/192 |
| 4,342,809 | 8/1982 | Newell | 428/215 |
| 4,465,248 | 8/1984 | Rotter | 242/192 |
| 4,466,564 | 8/1984 | Smith et al. | 226/170 |

Primary Examiner—Leonard D. Christian
Attorney, Agent, or Firm—Robert S. Kelly

[57] ABSTRACT

A tape drive assembly includes a compact rectangular housing mounting a fixed take-up reel. A removable supply reel is mounted on a pivotable carrier which is adapted to be swung into a closure position on the housing to place the supply reel in operative position adjacent the take-up reel. In such operative position the supply reel is frictionally engaged by an endless drive belt which also frictionally engages the take-up reel so as to drive both reels and cause the tape to be fed therebetween in a path that passes adjacent a read/write head. The drive belt is formed of a viscoelastic material so that it is maintained on its supporting rollers under tension with the supply reel in or out of engagement with it and so that a constant tension is maintained on the drive belt, and hence the tape, at different driving speeds.

15 Claims, 13 Drawing Figures fig_5 fig_6 fig_7

REEL TO REEL TAPE DRIVE DEVICE

BACKGROUND OF THE INVENTION

1. Field of the Invention

The present invention pertains to reel to reel magnetic tape drive devices for use as peripherals in storing or transmitting information, and more particularly, it pertains to such devices which are driven by an endless drive belt which frictionally engages both the supply reel and the take-up reel.

2. Description of the Prior Art

Tape drive devices utilizing endless belts which are arranged to frictionally engage and drive both the supply and take-up reels are shown in prior U.S. Pat. to Merle 3,907,230, Von Behren 3,692,255, Masterson 2,743,878 and Grant 3,808,902.

In U.S. Pat. No. 4,274,608 to Gilovich et al a tape transport is disclosed wherein an endless belt is used to drive a magnetic tape between a supply reel and a take-up reel and about a rotatable read/write drum having magnetic heads thereon. The supply reel is mounted in a carrier which is movable to place the reel into and out of frictional engagement with the drive belt.

Finally, U.S. Pat. No. 4,054,923 to Lewis discloses a tape transport wherein an endless belt is used to drive a magnetic tape between a supply reel and a take-up reel in a generally arcuate path and past a read/write head which is generally centered between the reels. The supply reel is movable into and out of frictional engagement with the drive belt which is driven by means of a drive pulley located between the reels adjacent to the read/write head.

SUMMARY OF THE INVENTION

With the tape drive of the present invention a self contained assembly is provided which, like certain of the prior art devices, permits the supply reels to be readily changed when desired. The driving mechanism comprises an endless belt which frictionally engages both the supply reel and the take-up reel causing the tape to be transferred between the reels along a tape feed path which is located adjacent to a fixed read/write head.

The endless drive belt is formed of a visco-elastic material which is stretched so that even with a fixed drive pulley and fixed idler pulleys supporting the drive belt, the drive belt will be maintained in tension about such pulleys with the supply reel both out of engagement and in circumferential engagement with a reach of the drive belt. The viscoelastic properties of the drive belt also permit this belt to maintain a generally constant amount of tension on the tape as it is moved from one reel to the other at different driving speeds. By maintaining constant tension the the spacing of the tape feed path and the read/write head is maintained constant in order to preserve the integrity of the data transferred between the tape and the read/write head.

DESCRIPTION OF THE PREFERRED EMBODIMENT

Figure 3:
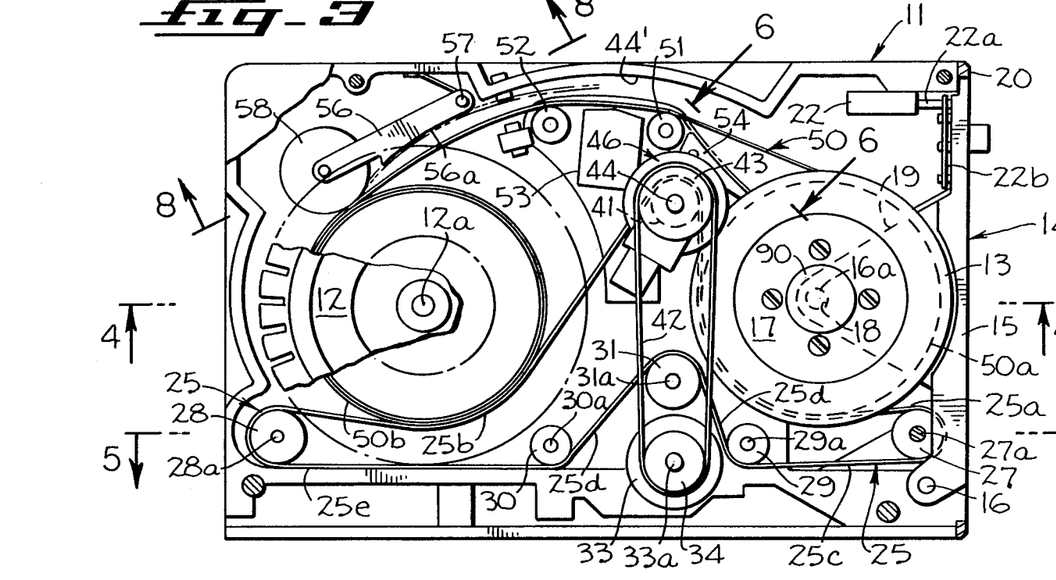
FIG. 3 is a top plan view similar to FIG. 2 but showing the supply reel in its loaded, operative position in engagement with the drive belt.
Figure 3A:
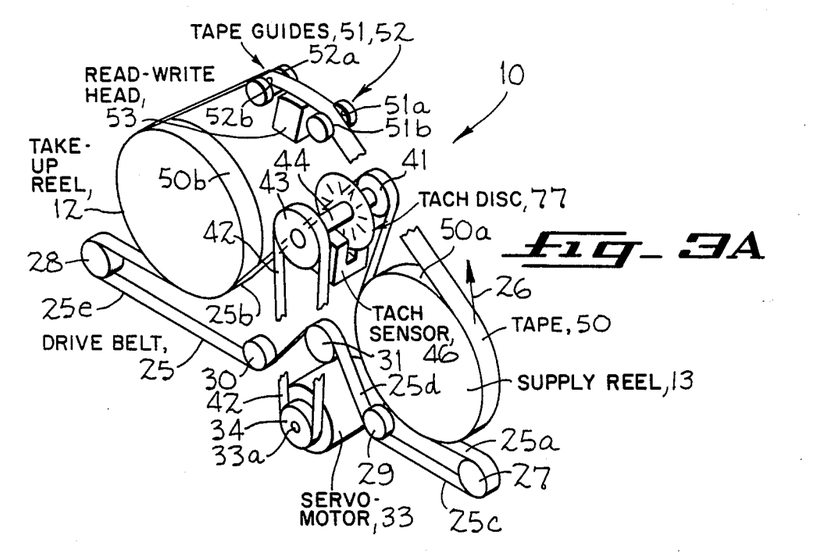
FIG. 3A is an exploded diagrammatic view of the major components of the tape drive assembly of the present invention.

The basic structural arrangement for the tape drive assembly 10 of the present invention is shown in FIG. 3A. A supply of tape 50 is arranged to be driven between a supply reel 13 and a take-up reel 12 by an endless drive belt 25 which peripherally frictionally engages the tape on both reels. The drive belt is mounted by five idler pulleys 27, 28, 29, 30 and 31 and by a drive pulley 41. The tape is driven between the reels along a generally arcuate path so that it passes adjacent a read/write head 53 where information can be read off the tape or transferred to the tape in the conventional manner. The speed of the drive belt 25 (and hence the tape 50) is monitored by a tach disc and tach sensor assembly provided on the drive shaft 44 which is arranged to be driven by a DC servo-motor 33 and suitable motor controller circuitry (not shown). In accordance with the present invention, the motor 33 is a variable speed motor so that the tape can be driven at different speeds to accomodate different data transfer rates.

Figure 1:
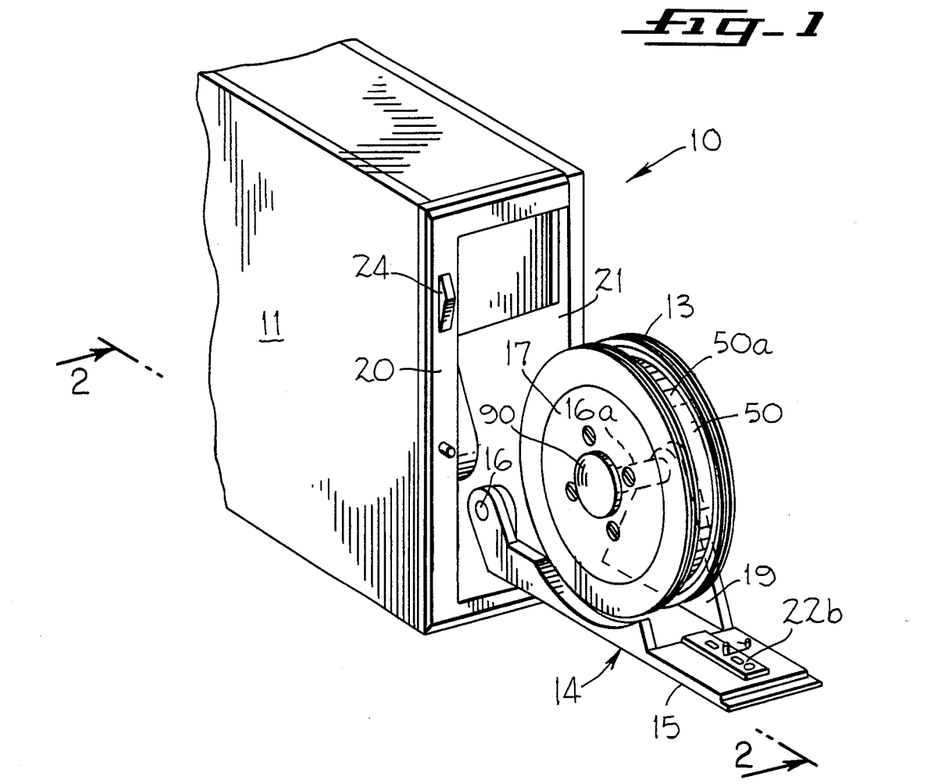
FIG. 1 is a perspective view of an end portion of a tape drive assembly embodying the invention illustrating the supply reel in its loading, non-operative position.
Figure 2:
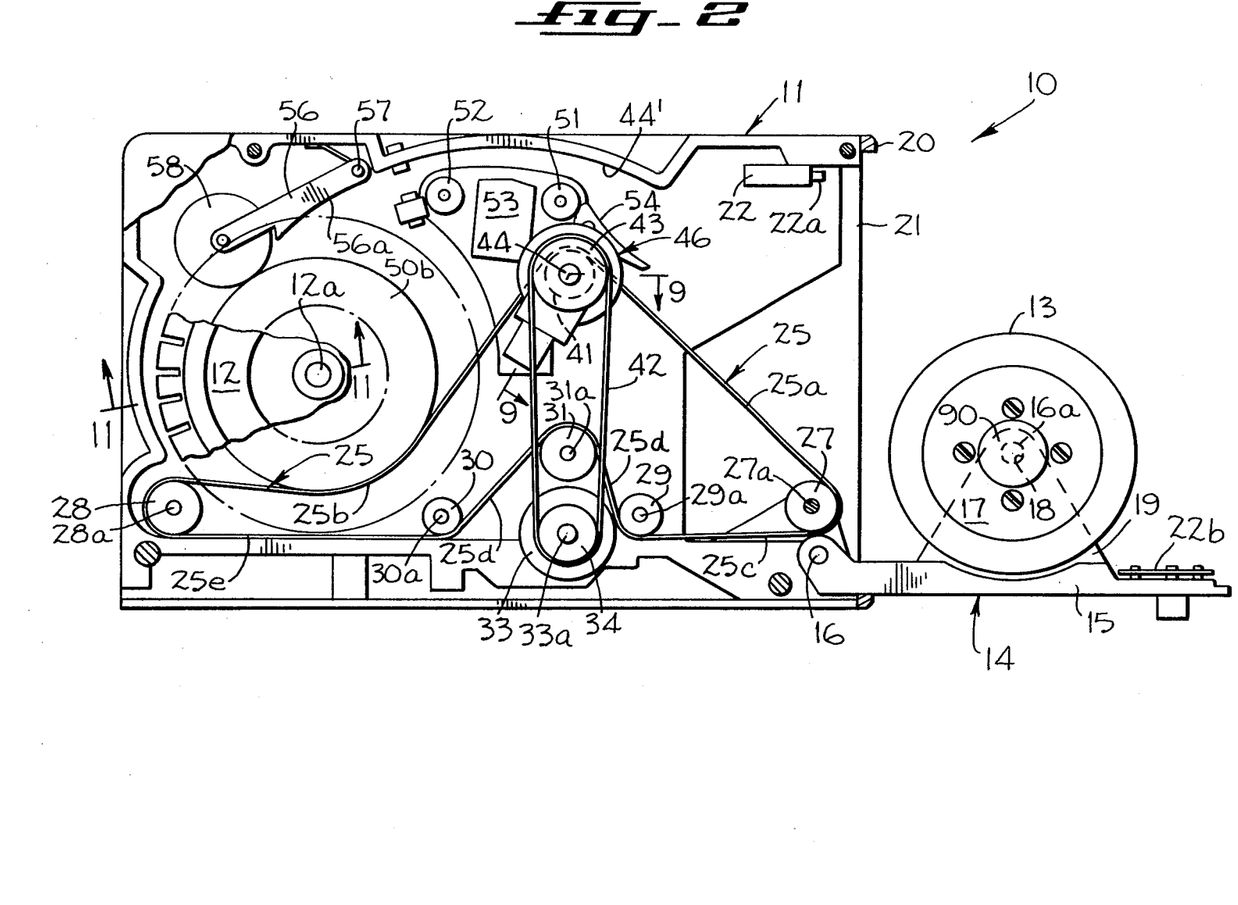
FIG. 2 is a top plan view of the FIG. 1 tape drive assembly generally taken in the plane of line 2—2 with the top housing cover broken away and the assembly partially shown in section and the supply reel being shown in its non-operative position.

Referring now to FIGS. 2, 3 and 3A, the tape drive assembly 10 will be seen to include a housing 11 for the tape take-up reel 12, that remains in the housing, and for the tape supply reel 13 that is precisely insertable into the housing on a movable carrier 14 and that is removable from the housing on the same carrier. The latter comprises a closure plate 15 pivotably carried by the housing at 16 so as to swing between an open position (FIG. 2) and a closed position (FIG. 3). FIGS. 1 and 2 show the carrier as having an axle or pin 16a onto which the supply reel 13 is removably received and axially rotatably supported. Reel 13 has a central hub 17 about which the magnetic tape is arranged to be wrapped. The hub defines an axial bearing opening 18 to receive the axle 16a which is carried on a bracket 19 attached to closure plate 15. FIG. 1 shows the housing end wall 20 to include an opening 21 which closure plate 15 covers when it is pivoted upwardly to its closed position. A latch for the closure includes a solenoid 22 mounted to a housing inner wall and having a plunger 22a with a mechanical latch thereon. When the closure is electrically energized, by activation of switch arm 24

Figure 4:
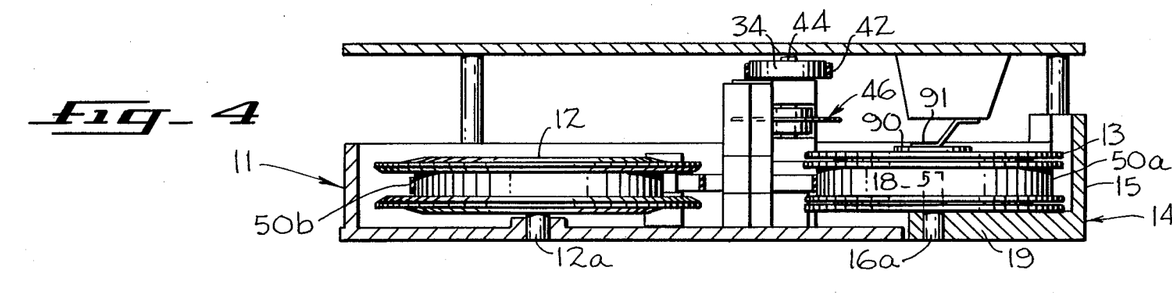
FIGS. 4 and 5 are sections taken on lines 4—4 and 5—5, respectively, of FIG. 3.

(FIG. 1), the solenoid 22 will be energized to displace plunger 22a out of locking engagement with keeper 22b on the closure plate to release the closure and allow it to be automatically opened by the drive belt tension exertion on the tape reel 13 pushing it outwardly. See, for example, in FIG. 3A the tensioned reach 25a of belt 25 urging reel 13 in the direction of arrow 26. When switch arm 24 is in its OFF position, the solenoid is deactivated and the closure will, if closed, remain in closed and locked position. Take-up reel 12 is mounted for rotation on an axle 12a (FIG. 4) fixedly attached to the housing.

The endless drive belt 25 is located so as to arcuately frictionally engage the tape rolls 50a, 50b on the two reels 12 and 13, respectively, for rotating the reels and effecting tape transport. When supply reel 13 is in its fully inserted position, as seen in FIG. 3, a substantial circumferential portion of the outer winding of tape roll 50a will be engaged by the drive belt, and, in response to endwise travel of the belt, the tape will be fed off on its arcuate path as shown in FIG. 3. Initially, the hub of take-up reel 12 is wrapped by the drive belt, and, as the tape is fed onto reel 12, the outer winding of the tape will be received. Reaches 25a and 25b of the belt thus are bowed to the tape rolls 50a and 50b, as is clear from FIG. 3A, to maintain the belt in tension. The drive belt is entrained about guide rollers or pulleys which direct the belt in close proximity to the reels. These include idler pulleys 27-31 and drive pulley 41. Belt reach 25c travels between idler rollers 27 and 29, and belt reach 25e travels between idler rollers 30 and 28. Intermediate the belt reaches 25c and 25e is a pair of short reaches 25d which travel between idler pulleys 29 and 30 and wrap partially about an intermediate idler pulley 31 to provide a space (see FIGS. 2 and 3) for the drive elements including DC servomotor 33, motor output shaft 33a, and a drive pulley 34 attached at the upper end of shaft 33a.

It will be seen that the drive belt engages only the protective Mylar surface of the magnetic tape 50 and does not contact the data surface of the tape which passes adjacent to the read/write head 53 as the tape is moved in its arcuate tape feed path between the reels 12 and 13. Thus, there is no irritation to the data surface due to the drive which could affect data integrity.

It is an important feature of the present invention that the belt 50 be formed of a viscoelastic material, i.e., one which when subjected to a sinusoidally oscillating stress has a strain neither in phase (as it would be for an elastic material) nor 90° out of phase (as it would be for a viscous material) but somewhere in between. Some of the energy input is stored and recovered in each cycle and some is dissipated as heat. The preferred material is a polyurethane film sold under the trademark Tuftane. This material has a relaxation time or relaxation constant as provided by the standard stress relaxation test (ASTM D2991-71) of 8-10 seconds, and, in accordance with the present invention, it is desired that the relaxation constant be greater than two seconds in order to achieve the desired results. The relaxation constant is measured as the time required for the stress of the material to decay to 36.8% (1/e) of its final steady state value after the application of a constant strain to the material.

The belt material can be prepared by cutting it from a flat sheet and stretching it while applying heat until the desired size with the desired tension characteristics are achieved. This requires that the material be brought into the upper flat portion of the force-elongation curve (static) where the force is generally a constant maximum value to produce varying elongations. This requires stretching of the material to roughly 150-300% of its initial value. In the present invention, it is desired to have a static tension on the tape during operation (i.e., with supply reel 13 in place) of about 8 to about 12 ounces. This produces a static tension in the tape of 1-3 ounces where 2 ounces is the desired tension. Due to its viscoelastic properties the tension will remain constant as the speed of the motor 33 is varied. This is important since the tension on the tape determines the spacing of the tape from the read/write head which is essential for data integrity. Also, the viscoelastic properties of the belt provide belt dampening preventing fluttering of the tape as it is driven by the read/write head.

The belt should preferably have a dynamic belt modulus defined as the product of $A \times E$ in the range of from about 60 to about 150 ounces wherein A is the cross sectional area of the belt during operation and E is Young's modulus of the belt at the point or region at which the belt is elongated.

It will also be noted that the tension in the drive belt is maintained between the unloaded (FIG. 2) and loaded (FIG. 3) positions of the supply reel 13. Thus, the pulleys 27-31 and 41 supporting the drive belt can be fixed in position in the housing 11, and the drive belt remains in tension to keep it in place on the pulleys in the relaxed unloading position where the reach 25a of the belt is unbowed (i.e., it is significantly shorter than when the supply reel is loaded).

Figure 5:
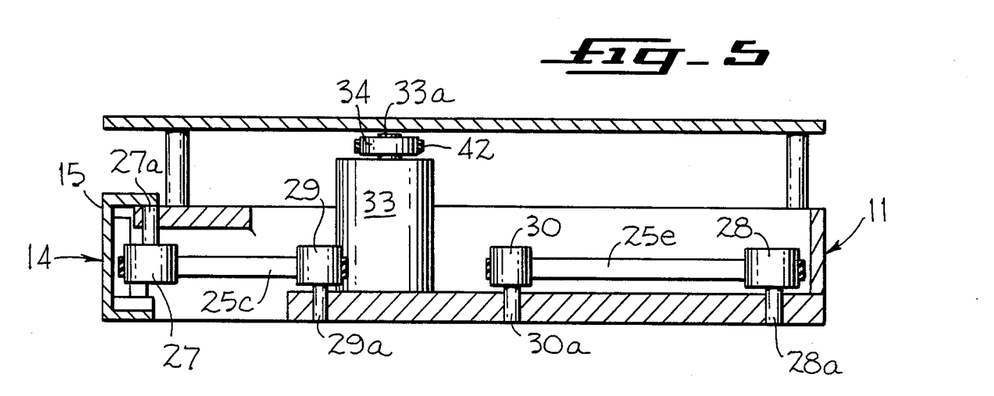

The pulleys 27 and 28 (FIG. 5) are supported on axles 27a and 28a, respectively, while pulleys 29, 30 and 31 are supported on axles 29a, 30a and 31a (FIG. 3), respectively, via bearings supported for rotation to develop a predetermined amount of friction acting as drag opposing endwise travel of the belt, thereby to develop pre-determined tension in the belt and in the tape being transported between the reels (1-3 ounces in the tape, static tension, with two ounces providing optimum results). Such tension serves to rotate the reels and the tape thereon with positive drive coupling in each of the two directions of tape travel. In this regard, drag is developed in belt reach 25a as drive pulley 41 is rotated counterclockwise in FIG. 3 to positively drive supply reel in tape take-up mode; and similarly, drag is developed in belt reach 25b as drive pulley 41 is rotated clockwise to positively drive take-up reel 12 in its take-up mode.

Figure 9:
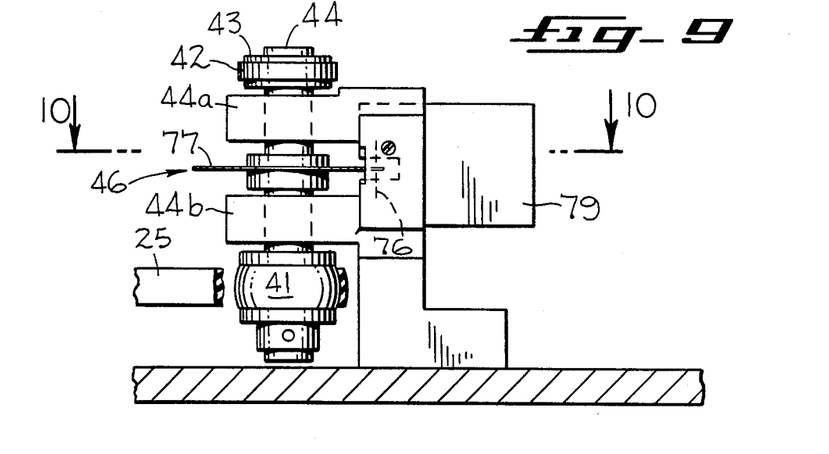
FIG. 9 is an enlarged section taken on line 9—9 of FIG. 2.
Figure 10:
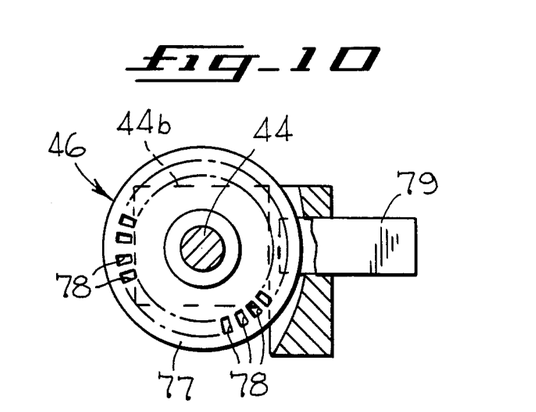
FIG. 10 is a section taken on line 10—10 of FIG. 9.

The drive to the drive pulley 41 includes auxiliary motor drive belt 42 which is entrained about pulleys 34 and 43. The pulley 34 is directly connected to the motor 33 by drive shaft 33a, and the pulley 43 is mounted on an upright shaft 44 (FIG. 9) connecting the pulley 43 with drive pulley 41. As shown in FIG. 9, bearing 44a and 44b are provided for the shaft 44. The drive pulley is located generally between the two reels, as is clear from FIG. 3, whereby angular wrap of belt reaches 25a and 25b about the reels and the tape packs thereon is assured for effective drive at all conditions of tape loading on the two reels. Also, space is provided between the drive pulley 41 and pulleys 29-31 for reception of a tachometer sensor device, indicated at 46 (FIGS. 9 and 10).

Referring again to FIGS. 3 and 3A, it will be seen that the tape 50 that is directed between the packs 50a and 50b on the reels 13 and 12, respectively, is entrained over tape guide rollers 51 and 52, so as to pass directly adjacent to the read/write head 53. The guide rollers 51 and 52 are provided with annular shoulders 51a and 51b and 52a and 52b (FIG. 3A) between which the edges of the tape are guided so that the tape will accurately pass at a predetermined distance adjacent the convex surface of the read/write head.

Figure 6:
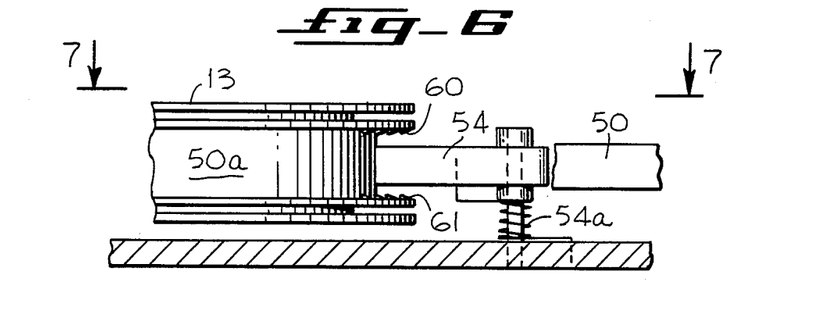
FIG. 6 is an enlarged section taken on line 6—6 of FIG. 3.
Figure 7:
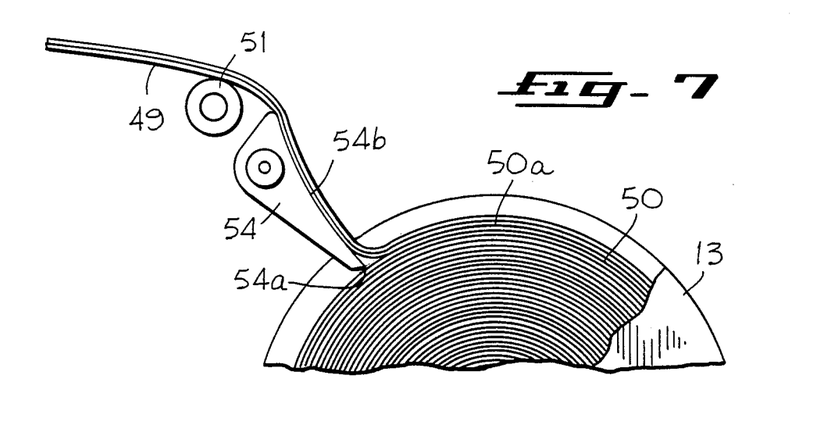
FIG. 7 is a top plan view taken in the direction of the arrows 7—7 of FIG. 6, showing the stripper finger for stripping the tape leader from the supply reel.
Figure 8:
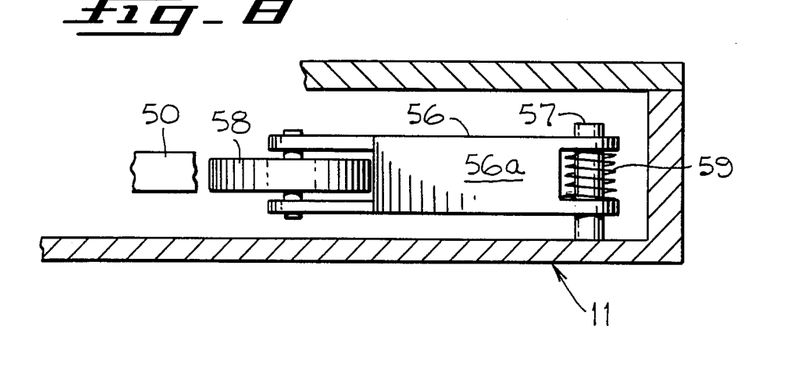
FIG. 8 is an enlarged section taken on line 8—8 of FIG. 3.

As seen in FIGS. 3, 6 and 7 a stripper finger 54 is pivotably mounted in the housing and projects to a position adjacent the outer tape winding on supply reel 13. The finger is adapted to be received under the tape leader 49 (FIG. 7) as the tape pack 50a is rotated on the supply reel 13 under the urging of the drive belt 25. The finger serves to strip the leader free of the tape pack as the reel rotates in a tape supply direction (counterclockwise in FIG. 3). The finger tapers toward an apex 54a (FIG. 7) that initially strips the leader free of the tape pack so that the leader is then deflected by the concave surface 54b of the finger to pass adjacent guide roller 51 and toward a concave inner wall surface 44' of the housing. The leader then travels adjacent surface 44' which curves generally back toward the periphery of the take-up reel 12. In so traveling, the leader passes adjacent the inwardly concave surface 56a of an arm 56 pivoted at 57 to the housing wall. The free end of the arm carries a guide roller 58 acting to feed the tape leader onto the hub of reel 12 for capture as that reel is rotated by the drive belt reach 25b initially engaging its hub. Capture of the leader may be effected in the manner described in prior U.S. Pat. No. 4,054,923 to Lewis. A torsion spring 59 (FIG. 8) acting on arm 56 urges it and the roller 58 toward reel 12, the roller penetrating between the reel flanges. In a similar manner, a torsion spring 54a (FIG. 6) urges stripper finger 54 toward reel 13, as described in said U.S. Pat. No. 4,054,923.

Figure 11:
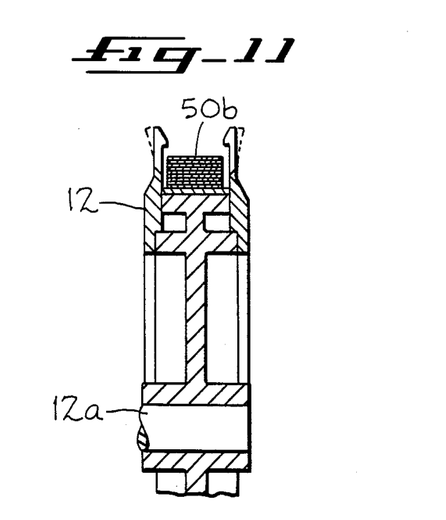
FIG. 11 is an enlarged fragmentary section taken on line 11—11 of FIG. 2.

The reels 12 and 13 may have constructions as disclosed in prior U.S. Pat. No. 4,054,923, referred to above, or as disclosed in prior U.S. Pat. No. 4,168,811 to Lewis. As disclosed such patents, the magnetic tape is narrower than the leader at the end thereof which leader is gripped by the reels to properly feed the tape onto and off of the reels in a centered position. As disclosed in FIG. 6 herein, the supply reel is constructed to provide capture of the leader between a pair of flexible annular projections 60 and 61 that grip the opposite edges of the tape leader. The annular projections flex outwardly in response to such gripping whereby the tape pack 50a is maintained centered on the hub of the supply reel spaced from the protective flanges extending inwardly from the projections 60, 61. In operation, such annular projections on reel 13 serve to capture the leader to enclose and confine the tape wrapped about the central hub thereof. Similar annular projections on take-up reel 12 (FIG. 11) serve initially to capture the stiff leader feeding onto that reel by flexing outwardly slightly, as shown in broken lines in FIG. 11.

Figure 12:
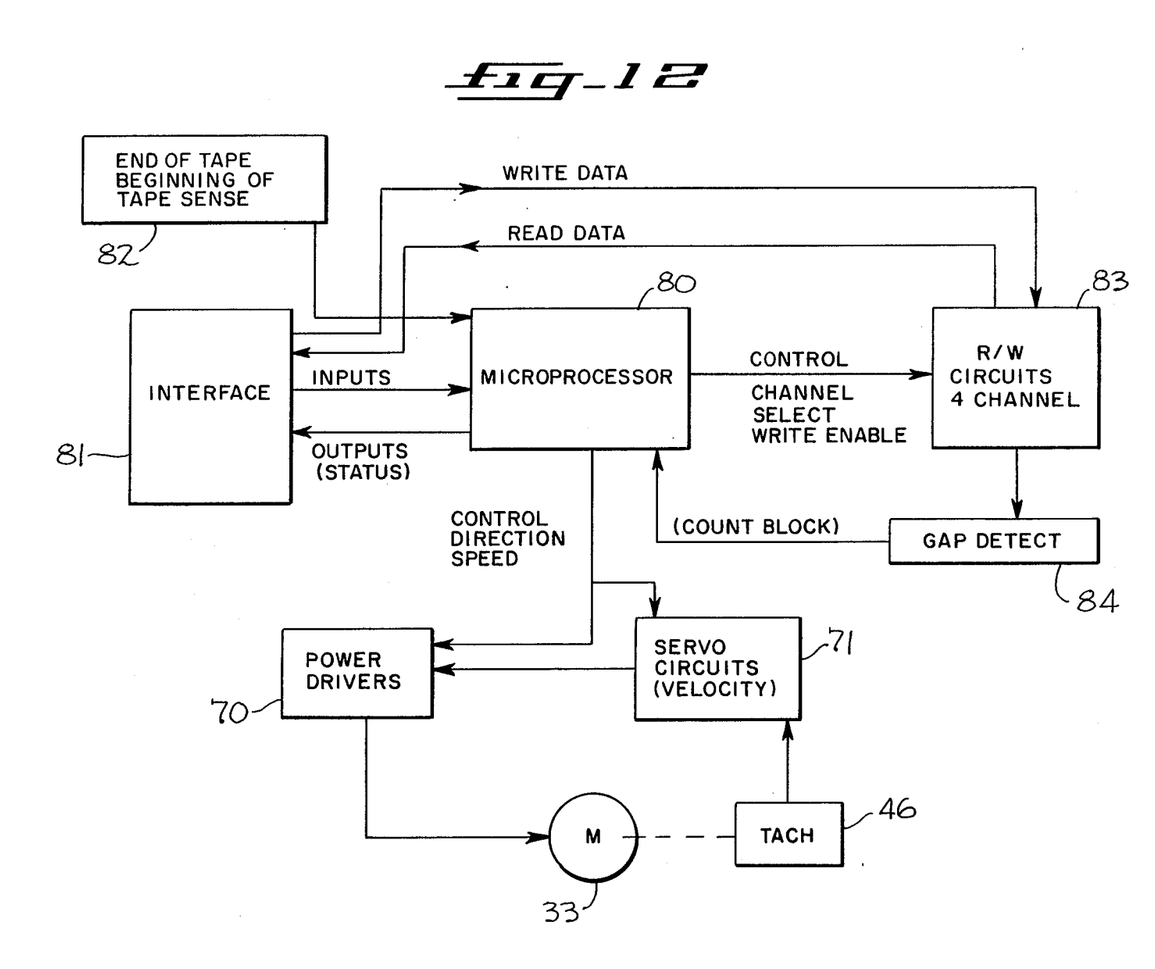
FIG. 12 is a block diagram of the control circuitry for the tape drive assembly of the present invention.

FIG. 12 illustrates, in block diagram form, the control system for the tape drive assembly of the present invention. The reversible DC servomotor 33 is driven in response to current input from power drive circuits 70. The latter is, in turn, controlled by servo-circuitry 71 having an input from the tachometer sensor device 46 and an input from a microprocessor 80 which controls the velocity of tape transport between the reels and also the direction of such transport (by direct control of power drive circuits 70).

Sensing of the speed of the drive pulley 41 and of the consequent speeds of the drive belt 25 and tape 50, for motor speed control, is effected via tachometer sensor device 46, best seen in FIG. 9. The latter serves to pass a light beam 76 (FIG. 9) normal to the plane of a tachometer disc 77 that is mounted on the upright shaft 44 (FIGS. 9 and 10). The disc 77 contains a circular array of through openings 78 which are equally angularly spaced to repeatedly interrupt the light beam as the disc rotates. A beam detector 79 provides a square wave signal output for counting purposes and to provide a rate output proportional to the rotary speed of the drive pulley and thus to the linear speed of the tape. This signal is transmitted to the servo circuitry 71 so that the driving speed remains constant.

As further seen in FIG. 12, the microprocessor 80 sends its control function signals (channel select and write enable) to the read/write circuitry 83 which interfaces with the read/write head 53. In the presently described embodiment of the invention there are four channels (or tracks) for data on the tape 50. The microprocessor receives control imputs from and outputs status information to the interfacing circuitry 81 which interfaces with the host or user system. The read/write data from the circuitry 83 is transferred directly between the circuitry blocks 81 and 83 as shown. Conventional end and start of tape signals are sensed (by means not shown) and circuitry 82 provides this information to the microprocessor 80.

One last bit of control information is provided by a spring 91 (FIG. 4) which is adapted to receive and register with a raised axial projecting portion 90 on the top of the supply reel 13. Thus, when the supply reel is in its loaded position (FIG. 3), the supply reel will be captured between the spring 90 and the axle 16a. The control information is provided to the microprocessor 80 by means of a strain gauge or other sensor associated with spring 91 (not shown) which serves to indicate that the supply reel is in position to feed tape to the read/write head 53.

Although the best mode contemplated for carrying out the present invention has been herein shown and described, it will be apparent that modification and variation may be made without departing from what is regarded to be the subject matter of the invention.

What is claimed is:

1. A tape drive assembly comprising a housing, a take-up reel mounted for rotation in said housing, an endless drive belt, a drive pulley and a plurality of idler pulleys positioned in said housing and mounting said drive belt so that one reach thereof is wrapped about a circumferential portion of said take-up reel, means nonmovably attached to said housing for rotatably mounting said drive pulley and each of said idler pulleys, means for driving said drive pulleys at variable speeds and in both forward and reverse directions, means mounting a supply reel for movement into and out of circumferential engagement with a second reach of said drive belt, said belt being substantially stretched when the supply reel is moved into circumferential engagement therewith, means for directing tape from one of said reels to the other of said reels along a tape feed path when said drive means is energized for driving said drive belt, and a read/write head fixedly positioned adjacent said tape feed path, said belt being formed of a viscoelastic material which maintains a generally constant tension on said tape throughout the variable speed range of said drive means so as to keep the tape in said tape feed path and maintain a predetermined close spacing of the tape and said read/write head throughout said speed range, said viscoelastic material of said belt maintaining the belt under tension with said supply reel both in and out of engagement therewith.

2. A tape drive assembly according to claim 1 wherein said means mounting said supply reel for movement comprises a carrier having a rotary support member for receiving said reel and means mounting said carrier on said housing for movement relative thereto.

3. A tape drive assembly according to claim 2 wherein said means mounting said carrier comprises means pivotally mounting the carrier to said housing.

4. A tape drive assembly according to claim 3 wherein said carrier comprises a closure for said housing on one wall thereof when the supply reel is moved into driving engagement with said drive belt.

5. A tape drive assembly according to claim 1 wherein said drive belt has a dynamic belt modulus defined as the product of $A \times E$ in the range of from about 60 to about 150 ounces wherein A is the cross sectional area of the belt during operation and E is Young's modulus of the belt at the point or region at which the belt is elongated.

6. A tape drive assembly according to claim 1 wherein the tension on the tape is maintained at a predetermined value between one and three ounces during operation of the drive belt.

7. A tape drive assembly according to claim 6 wherein the tension on the drive belt is maintained at a predetermined steady state value between 8 to 12 ounces during operation.

8. A tape drive assembly comprising a take-up reel means mounting said take-up reel for rotation, an endless drive belt formed of a viscoelastic material having a relaxation constant of at least two seconds, a drive pulley and a plurality of idler pulleys mounting said drive belt so that one reach is wrapped about a circumferential portion of said take-up reel, means non-movably attached to said housing for rotatably mounting said drive pulley and each of said idler pulleys, means mounting a supply reel for movement into and out of circumferential engagement with a second reach of said drive belt, said belt being substantially stretched when the supply reel is moved into circumferential engagement therewith, means for directing tape from one of said reels to the other of said reels along a tape feed path when said drive means is energized for driving said drive belt, and a read/write head positioned adjacent said tape feed path.

9. A tape drive assembly according to claim 8 wherein said drive belt has a dynamic belt modulus defined as the product of $A \times E$ in the range of from about 60 to about 150 ounces wherein A is the cross sectional area of the belt during operation and E is Young's modulus of the belt at the point or region which the belt is elongated.

10. A tape drive assembly according to claim 8, wherein the tension on the tape is maintained at a predetermined value between one and three ounces during operation of the drive belt.

11. A tape drive assembly according to claim 10 wherein the tension on the drive belt is maintained at a predetermined steady state value between 8 to 12 ounces during operation.

12. A tape drive assembly comprising a housing, a take-up reel mounted for rotation in said housing, an endless drive belt, a fixed drive pulley and a plurality of fixed idler pulleys positioned in said housing and mounting said drive belt so that one reach thereof is wrapped about a circumferential portion of said take-up reel, means non-movably attached to said housing for rotatably mounting said drive pulley and each of said idler pulleys, means for driving said drive pulley, means mounting a supply reel for movement into and out of circumferential engagement with a second reach of said drive belt, said belt being substantially stretched when the supply reel is moved into circumferential engagement therewith, means for directing tape from one of said reels to the other of said reels along a tape feed path when said drive means is energized for driving said drive belt, and a read/write head positioned adjacent said tape feed path.

13. A tape drive assembly according to claim 12 wherein said means mounting said supply reel for movement comprises a carrier having a rotary support member for receiving said reel and means mounting said carrier on said housing for movement relative thereto.

14. A tape drive assembly according to claim 13 wherein said means mounting said carrier comprises means for pivotally mounting the carrier to said housing.

15. A tape drive assembly according to claim 13 wherein said carrier comprises a closure for said housing on one wall thereof when the supply reel is moved into driving engagement with said drive belt.

* * * * *